Dec. 26, 1967 R. G. KROKER 3,360,311
BEARING ASSEMBLY
Filed June 26, 1964
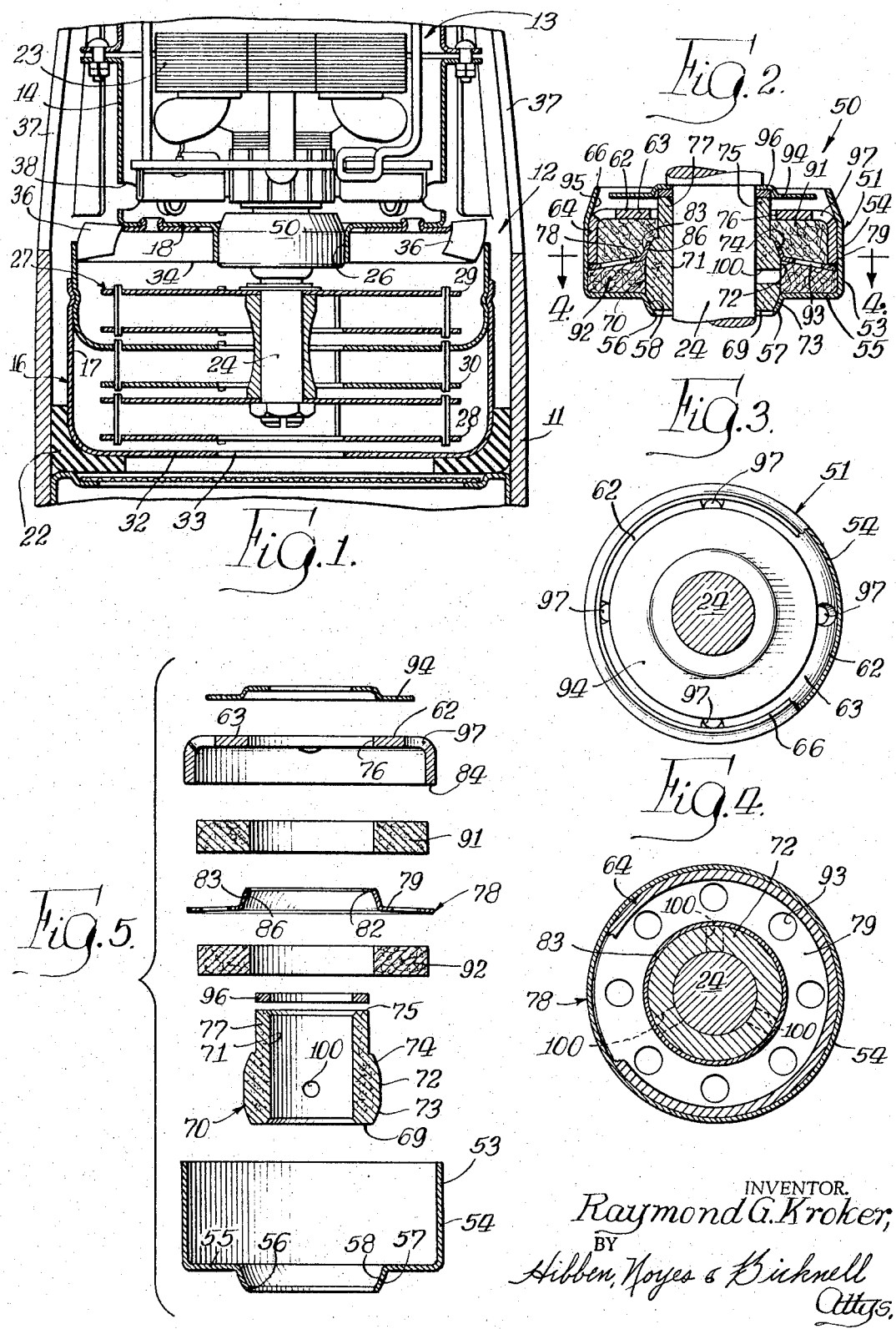
INVENTOR.
Raymond G. Kroker,
BY
Hibben, Noyes & Bicknell
Attys.

United States Patent Office 3,360,311
Patented Dec. 26, 1967

3,360,311
BEARING ASSEMBLY
Raymond G. Kroker, Normal, Ill., assignor to National Union Electric Corporation, Stamford, Conn., a corporation of Delaware
Filed June 26, 1964, Ser. No. 378,334
3 Claims. (Cl. 308—36.3)

This invention relates to bearings and more particularly relates to an improved self-lubricating and self-aligning sleeve bearing assembly adapted for use in a differential pressure environment.

One of the factors which has a significant effect on the life of self-lubricating sleeve bearing assemblies is the lubricant recirculation system employed therein. Conventionally, such bearing assemblies include a bearing member or sleeve of porous material, such as porous bronze, a housing enclosing the bearing member, a quantity of lubricant retaining material within the housing, and some form of lubricant recirculation system which usually includes a slinger for throwing lubricant leaking out of the bearing member back into the housing and into the retaining material for reuse. While such bearing assemblies perform satisfactorily under uniform ambient pressure conditions, premature failures have occurred when bearing assemblies of this type are utilized in a differential pressure environment.

Accordingly, it is a general object of the present invention to provide a novel and improved self-lubricating sleeve bearing assembly adapted for use in a differential pressure environment.

A more particular object is to provide a novel self-lubricating sleeve type bearing assembly of the foregoing character which is effective to prevent any substantial pressure gradient from developing along the length of the bearing bore due to different pressures at the ends of the assembly.

A specific object is to provide a novel and improved self-lubricating sleeve bearing assembly having a lubricant recirculation system, in which means is provided for substantially reducing any adverse effect on the recirculation system when the assembly is located in a differential pressure environment.

Another object is to provide a novel self-lubricating sleeve bearing assembly having an extended useful life when mounted in a differential pressure environment.

Other objects and advantages of the invention will become apparent from the following description and accompanying sheet of drawings, in which:

FIG. 1 is a fragmentary longitudinal sectional view of a portion of a vacuum cleaner and the motor-fan unit thereof, and showing a bearing assembly embodying the features of the present invention disposed between the motor and fan portions of the unit;

FIG. 2 is an enlarged longitudinal sectional view of the bearing assembly employed in the motor-fan unit illustrated in FIG. 1;

FIG. 3 is a top plan view of a bearing assembly illustrated in FIG. 2;

FIG. 4 is a horizontal sectional view taken along the line of 4—4 of FIG. 2; and FIG. 5 is a vertically exploded longitudinal sectional view of the bearing assembly illustrated in FIG. 2 and showing the relationship of the parts thereof prior to assembly.

In FIG. 1, a portion of a vacuum cleaner housing 11 is illustrated. A portion of a motor-fan unit 12, such as is disclosed and claimed in the pending Raymond G. Kroker and Richard E. Kronmiller application for patent entitled "Cooling Arrangement for a Vacuum Cleaner Motor or the Like," Serial No. 367,672, filed May 15, 1964, is shown mounted therein. Such a motor-fan unit includes a motor portion 13 enclosed in a generally cylindrical casing 14 and a depending fan portion 16 which is enclosed by a cup-shaped casing 17 secured to the motor casing 14 adjacent the bottom wall, indicated at 18, thereof. A seal ring 22, of sponge rubber or the like, supports and centers the lower fan portion 16 of the unit in the housing 11 and a similar support and seal ring (not shown) supports and centers the motor casing 14 in the housing 11.

An electric motor 23 having a vertically extending shaft 24 is mounted in the motor casing 14 with the shaft extending through an opening 26 in the lower end wall 18 of the motor casing and into the fan casing 17.

A bearing assembly 50 embodying the features of the present invention is mounted in the opening 26 for supporting and journaling the shaft 24. The details of the construction and operation of the bearing assembly 50 in the environment of the motor-fan unit 12 will be described more fully hereinafter.

A centrifugal-type fan 27 including a pair of axially spaced rotatable elements 28 and 29 are secured to the lower end of the shaft 24 for rotation within the fan casing 17 when the shaft is driven. A fixed fan element 30 is disposed between the rotatable elements 28 and 29. The lower end wall, indicated at 32, of the fan casing 17 is formed with a central opening 33 providing an inlet for the fan 27, and a substantially annular opening defined between the lower end of the motor casing 14 and the upper end of the fan casing 17 provides an outlet for the fan.

A stator assembly 34, including a plurality of circumferentially spaced radially outwardly extending blades or vanes 36, is secured to the bottom wall 18 of the motor casing 14 with the blades 36 disposed in the fan outlet for improving the efficiency of the fan. Air discharging from the outlet of the fan 27 is discharged to the atmosphere through openings or slots 37 formed in the side wall of the vacuum cleaner casing 11.

The upper end of the shaft 24 is supported by a bearing (not shown) mounted in the upper end wall (also not shown) of the motor casing 14 and in supplemental cooling fan (not shown) may be mounted on the motor shaft 24 above the motor 23 to provide a separate flow of cooling air through the motor casing 14 and around the motor 23, such flow discharging through openings or slots 38 in the side wall of the motor casing 14.

When the fan 27 and supplemental cooling fan are being driven, a zone of reduced or less than atmospheric pressure is defined around the hub of the fan 27 on the upper side of the upper rotating element 29. Such reduced pressure zone also acts on the lower side of the bearing assembly 50. When the supplemental cooling fan is utilized, a zone of increased or greater than atmospheric pressure is defined within the motor casing 14, which also acts on the upper end of the bearing assembly 50. Such high and low pressure zones thereby create a pressure differential across the bearing, which is undesirable because of its effect on the lubricating oil film between the bearing bore of the bearing assembly and the journal of the shaft 24. Specifically, the pressure differential acting on the upper and lower ends of the bearing assembly 50 tends to force the lubricating oil film out of the lower end of the bearing assembly. Consequently, where the bearing is of the self-lubricating type having a limited supply of lubricant, premature failure due to loss of lubricant may occur. However, because of the novel construction of the bearing assembly 50 now to be described, the aforementioned adverse effect of the pressure differential on the upper and lower sides of the bearing assembly is substantially eliminated.

Referring now to FIGS. 2 to 5 in conjunction with FIG. 1, the bearing assembly 50 comprises a cylindrical housing 51 which, in the present instance, is in two pieces. Thus, the housing 51 includes a lower cup-shaped section 53 having an annular side wall 54 and a bottom end wall 55. The end wall 55 has a central opening 56 formed therein and defined by an annular downwardly and inwardly tapering flange 57. The tapering inner surface, indicated at 58, defines a seat in the end wall 55 of the housing section 53.

The housing 51 also includes an upper inverted cup-shaped housing section 62 having an end or top wall 63 and an annular side wall 64 which is press fitted telescopically into the annular side wall 54 of the lower housing section 53 in the manner illustrated in FIG. 2. After assembly, the upper end, indicated at 66, of the annular side wall 54 is inturned slightly to retain the housing sections 53 and 62 in assembled relation.

Mounted in and enclosed by the housing 51 is a tubular bearing member or sleeve bearing 70 having an axially extending bearing bore 71 therethrough for journaling the motor shaft 24. The bearing member 70 includes a radially enlarged portion 72 of relatively increased wall thickness which is disposed toward one end, in this instance the lower end, indicated at 69, of the member 70, the portion 72 having annular axially spaced inwardly curved lower and upper surfaces 73 and 74, respectively. The lower curved surface 73 thus comprises a bearing surface adjacent the lower end 69 of the bearing member 70, which coacts with the seat 58 of the lower housing section 53 to provide a swivel mount for the bearing member 70. Such swivel mount permits the bearing member 70 to cock slightly relative to the housing 51. The bearing member 70 is thus self-aligning to a certain extent with respect to the shaft 24 so that installation of the latter is facilitated.

As will be apparent from FIG. 2, the bearing member 70 has an axial length somewhat greater than the spacing between the upper and lower end walls 62 and 55 of the housing sections 53 and 62 so that the upper end, indicated at 75, of the bearing member 70 extends through an opening 76 in the end wall 63 and somewhat thereabove. The opening 76 is sufficiently large to accommodate the aforementioned cocking movement of the bearing member 70 due to misalignment. The portion of relatively reduced wall thickness, indicated at 77, of the bearing member 70 above the radially enlarged portion 72 thus comprises a chimney or stack area which extends through the opening 76.

In order to maintain the lower curved surface 73 of the radially enlarged portion 72 engaged with the seat 58 in the lower housing section 53, a washer-like spring member or retainer 78 is provided. The spring member 78 includes an annular plate portion 79 having an annular upwardly and inwardly tapered flange 83 defining a central opening 82 therein. The plate portion 79 has a a diameter substantially equal to the internal diameter of the annular side wall 54 so that the plate portion 79 is peripherally engaged and retained by the annular end edge, indicated at 84 (FIG. 5), of the annular side wall 64 when the parts are assembled. The inner tapered surface, indicated at 86, of the flange 83 thus defines another seat which coacts with the upper inwardly curved surface 74 of the radially enlarged portion 72 to hold the lower curved surface 73 on its seat 58.

The interior of the housing 51 includes lubricant retaining means for retaining and continuously supply lubricant, such as lubricating oil, to the exposed external surfaces of the bearing member 70 which is of a porous bearing material, preferably porous bronze. In the present instance, the lubricant retaining means comprises a pair of oil-impregnated felt washers 91 and 92 disposed on the upper and lower sides, respectively, of the spring member 78. A flow path for lubricant between the felt washers 91 and 92 is provided by a series of circumferentially spaced openings 93 (FIGS. 2, 4 and 5) in the plate portion 79 of the spring member 78.

With the foregoing construction, lubricating oil in the felt washers 91 and 92 tends to flow radially inwardly through the porous bearing member 70 when the shaft 24 is rotating to establish a lubricating oil film between the inner surface of the bearing bore 71 and the journal of the shaft 24. Such inward flow is due in part to the higher temperature at the bearing bore when the shaft 24 is rotating.

Disregarding for the moment the existence of the high and low pressure zones at the upper end 75 and lower end 69 of the bearing member 70, and assuming that for other reasons a force is exerted on the lubricating oil film between the bearing bore 71 and journal of the shaft 24 tending to cause the oil to flow upwardly in the stack area 77 toward the upper end 75, means is provided for returning this flow to the interior of the housing 51 and the lubricant retaining washers 91 and 92. Such means in the present instance, comprises a disk member or slinger 94 mounted on the shaft 24 and enclosed by the inturned upper end 66 of the annular side wall 54. A washer 96 may be provided between the slinger 94 and upper end face of the bearing member 70 to axially locate the slinger 94 with respect to the inturned portion 66. Oil leaking out of the upper end of the bearing member 70 is thus transferred to the slinger 94 and flung radially outwardly from the periphery of the slinger and against the inclined inner surface, indicated at 95, of the inturned end 66. The oil then flows along the inner surface 95 of the inturned end 66 to reenter the interior of the housing 51 through a plurality of openings 97 (FIGS. 2, 3, and 5) in the end wall 63. It should be noted that the outer peripheral portions of the openings 97 extend into the corner junction of the end wall 63 with the annular side wall 64. Thus, oil flowing downwardly toward the openings 97 is not trapped in a pocket which might otherwise be formed at the juncture of the end wall 63 with the annular side wall 54.

Thus, the slinger 94, inclined inner surface 95 of the inturned portion 66, and openings 97 coact to define a recirculation flow path for returning lubricating oil which has leaked out of the upper end 75 of the bearing member 70 to the interior of the housing 51.

As heretofore mentioned, when the bearing assembly 50 is mounted in the motor-fan unit 12 the upper and lower ends 75 and 69 of the bearing member 70 are exposed to the high and low pressure zones resulting from the operation of the fan 27 and the supplemental cooling fan in the motor casing 14. Such differential pressure acting on the oil film between the bearing bore 71 and the journal of the shaft 24, exerts a force on the oil film tending to cause it to flow downwardly and out of the lower end of the bearing member 70.

Thus, according to the present invention, the bearing assembly 50 includes novel means for reducing the pressure gradient along the length of the bearing bore 71, which would otherwise result in a loss of lubricant out of the lower end of the bearing member. Such means comprises at least one and preferably a plurality of circumferentially spaced radially extending bores 100 (FIGS. 2, 4, and 5) formed in the radially enlarged portion 72 of the bearing member 70 and disposed axially centrally of the portion 72. In the present instance, three circumferentially spaced radial bores 100 are provided. The inner ends of the radial bores 100 open into the bearing bore 71 and the outer ends thereof communicate with the interior of the housing 51. The bores 100 thus serve to reduce the pressure gradient along the length of the bearing bore 71 by providing pressure relief passages to the interior of the housing 51. Consequently, oil loss through the lower end of the bearing bore 71 is substantially reduced.

While only one embodiment of the invention has been herein illustrated and described it will be understood that modifications and variations thereof may be effected without departing from the scope of the invention as set forth in the appended claims.

I claim:
1. In a motor-fan unit for a vacuum cleaner or the like, the combination of a motor having a rotatable shaft, a fan mounted on said shaft and rotatable therewith, a transverse support wall disposed between said motor and fan and having an aperture therein through which said shaft extends, said fan providing a low pressure zone adjacent the fan side of said support wall, the motor side of said support wall having a high pressure zone adjacent thereto, and a bearing assembly mounted in said aperture for journaling said shaft, said bearing assembly comprising a housing having an annular side wall peripherally engaging said aperture in said support wall and spaced end walls having openings therein, one of said openings defining a bearing seat, and a porous, lubricant-impregnated, tubular bearing member within said housing and having spaced ends and an axial bearing bore therethrough in which said shaft is journaled, one end of said bearing member extending through the other of said openings in communication with said high pressure zone and the other end of said bearing member communicating with said low pressure zone and having means defining a bearing surface in swiveling engagement with said bearing seat, and said bearing member having at least one radial bore therethrough disposed closely adjacent said other end thereof and said bearing seat, said radial bore communicating at its inner end with said bearing bore and at its outer end with the interior of said housing and being effective to reduce the pressure gradient along the length of said bearing bore and thus substantially prevent loss of lubricant from said bearing bore due to the presence of said high and low pressure zones at the ends of said bearing member.

2. The bearing assembly of claim 1 further characterized in that a plurality of said radial bores are provided in said bearing member in circumferentially spaced relation.

3. The bearing assembly of claim 1 further characterized in that a quantity of lubricant retaining material having a supply of lubricant is provided in said housing for supplying lubricant to said bearing member.

References Cited
UNITED STATES PATENTS

| | | | |
|---|---|---|---|
| 1,062,638 | 5/1913 | Dillon | 308—134.1 X |
| 1,272,681 | 7/1918 | Layne. | |
| 2,226,622 | 12/1940 | Lignian. | |
| 2,232,788 | 2/1941 | Kitto | 308—134.1 |
| 2,571,868 | 10/1951 | Haller. | |
| 2,602,712 | 7/1952 | Johnston | 308—134.1 |
| 3,109,684 | 11/1963 | Tupper. | |

EDGAR W. GEOGHEGAN, *Primary Examiner.*

DAVID J. WILLIAMOWSKY, MARTIN P. SCHWADRON, FRANK SUSKO, *Examiners.*

R. F. HESS, *Assistant Examiner.*